J. H. WILLIAMS.
ADJUSTING DEVICE.
APPLICATION FILED AUG. 28, 1912.
1,088,643.
Patented Feb. 24, 1914.
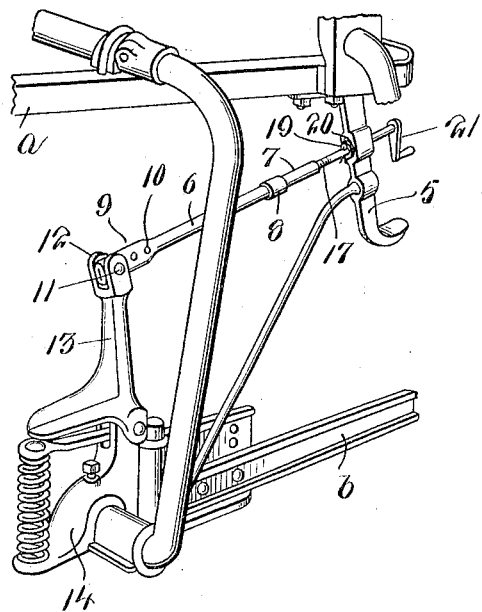
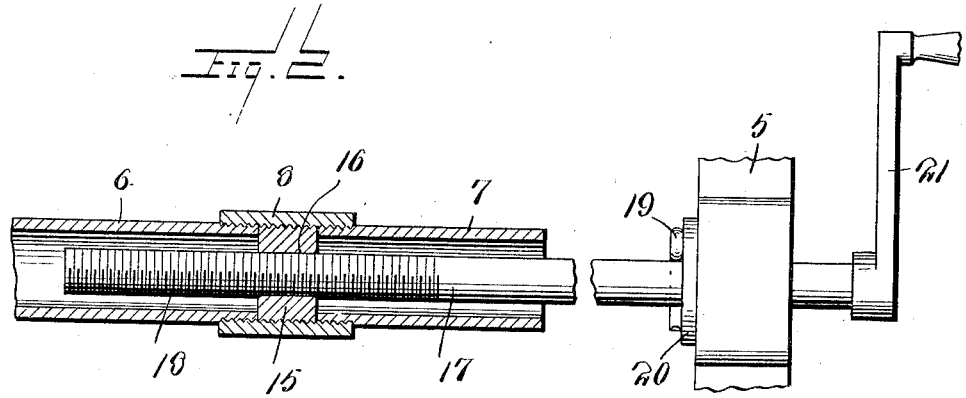
Witnesses
E. Q. Ruppert
E. S. Mueller
Inventor
J. H. Williams
By Victor J. Evans
Attorney

UNITED STATES PATENT OFFICE.

JOHN H. WILLIAMS, OF GIRARD, ILLINOIS.

ADJUSTING DEVICE.

1,088,643.  Specification of Letters Patent.  Patented Feb. 24, 1914.

Application filed August 28, 1912.   Serial No. 717,533.

*To all whom it may concern:*

Be it known that I, JOHN H. WILLIAMS, a citizen of the United States, residing at Girard, in the county of Macoupin and State of Illinois, have invented new and useful Improvements in Adjusting Devices, of which the following is a specification.

The general object of this invention is the provision of an adjusting device particularly adapted for use in connection with farming implements, said device being adapted to facilitate and improve the operation of adjusting said implement vertically; and to this end the invention consists of certain novel arrangements, constructions, and combinations of devices which will be fully described hereinafter and then pointed out in the appended claims.

In carrying out the object of the invention generally stated above, it will be understood, of course, that the essential features thereof are susceptible to changes in details and structural arrangements, one preferred and practical embodiment being shown in the accompanying drawing, wherein:

Figure 1 is a fragmentary perspective view of a portion of a plow beam showing the device applied thereto and constructed in accordance with the invention. Fig. 2 is an enlarged vertical longitudinal sectional view of the device.

Referring more particularly to the accompanying drawing in which like reference characters designate similar parts, $a$ indicates generally the frame of a cultivator and $b$ a portion of one of the gang plows which is connected to the frame in any preferred manner.

Carried by the frame $a$ adjacent the seat of the cultivator is a bracket 5 having an opening therein adapted to receive a portion of the adjusting device which will be presently described. The adjusting device comprises a pair of tubular pipes or sections 6 and 7, adjacent the ends of said pipes being connected by means of a sleeve 8 having internal threads adapted to engage external threads formed upon the said adjacent ends of the pipes 6 and 7. The pipe 6 is flattened for a portion of its length at the free end thereof as indicated at 9 and said flattened portion is provided with a plurality of transverse apertures 10 which are adapted to receive a pivot pin 11 which passes through the bifurcated end 12 of a bell crank lever 13. The lever 13 is pivoted to the element 14 and is connected to the plow beam $b$ in such a manner so that when the pipes 6 and 7 are actuated in a manner to be presently described, said bell crank lever will be rocked and the plow beam $b$ raised or lowered as may be desired. The ends of the pipes 6 and 7 which are within the sleeve 8 are spaced by means of a jam nut 15 having external threads adapted to engage the internal threads of said sleeve and also having a centrally threaded opening 16.

Rotatably mounted in the opening formed in the bracket 5 is an operating rod 17 which extends longitudinally of the sleeves 6 and 7 and which is provided upon its inner end with a threaded portion 18 adapted to engage the threaded opening 16 of the jam nut 15. The operating rod 17 is prevented from longitudinal movement in one direction by reason of the connection between the pipe 6 and the bell crank lever 13 and in the other direction by means of a cotter pin 19 which engages a transverse opening formed in said rod and which also abuts against the washer 20 mounted upon said rod contiguous to the bracket 5. The free end of the operating rod 17 is provided with a suitable handle 21 which is located adjacent the driver's seat on the cultivator so that when it is desired to raise or lower the plow beam, the handle 21 may be conveniently reached and rotated thus causing the pipes 6 and 7 to move in either direction, whereby the bell crank lever 13 will be actuated to cause the said plow to assume an adjusted position.

From the foregoing description taken in connection with the accompanying drawing, it will be seen that the invention contemplates providing a plow adjustment which is simple in construction, thus reducing the cost of manufacture of the same to a minimum, and which is durable and effective in carrying out the purpose for which it is designed.

What is claimed is:—

1. An adjusting device including a lever connected to the article to be adjusted, a pair of alining pipes, one of said pipes being connected to the lever, means for spacing the adjacent ends of the pipes, an operating rod mounted in said spaced means, the connection between said rod and means inducing longitudinal movement of the pipes in the rotation of the rod.

2. An adjusting device including a lever connected to the article to be adjusted, a pair of alining pipes, one of said pipes being connected to the lever, an interiorly threaded block spacing adjacent ends of the pipes, an operating rod held against longitudinal movement and threaded for engagement with the block.

3. An adjusting device including a lever connected to the article to be adjusted, a pair of alining pipes, one of said pipes being adjustably connected to the lever, means for spacing the adjacent ends of the pipes, an operating rod mounted in said spaced means, the connection between said rod and means inducing longitudinal movement of the pipes in the rotation of the rod.

In testimony whereof I affix my signature in presence of two witnesses.

JOHN H. WILLIAMS.

Witnesses:
J. M. METCALF,
E. E. LITTLEPAGE.